3,147,242
METHOD OF POLYMERIZING A MIXTURE OF CIS- AND TRANS-PIPERYLENES
Richard S. Stearns, Malvern, Pa., assignor to The Firestone Tire & Rubber Company, Akron, Ohio, a corporation of Ohio
No Drawing. Filed May 15, 1961, Ser. No. 109,812
5 Claims. (Cl. 260—94.2)

This invention relates to the polymerization of piperylene. Piperylene polymers make valuable additions to tire tread and sidewall stocks, are useful for chlorination to produce chlorinated products having properties similar to chlorinated Hevea rubber, etc. The solution and emulsion polymers described herein have different properties and each is preferred to the other for different purposes.

Piperylene has been commercially available as a mixture of about 55 to 85 percent of the trans-isomer and about 45 to 15 percent of the cis-isomer. Cis-piperylene polymerizes several times faster than trans-piperylene in aqueous free radical systems. It has now been found that exactly the reverse is true of polymerizations using lithium-based catalysts, in which systems trans-piperylene polymerizes several times faster than cis-piperylene.

According to the present invention any mixture of piperylene stereoisomers containing at least about 20 percent of each is first polymerized in a system in which one of the isomers (herein called the first monomer) is polymerized at least twice as rapidly as the other isomer (herein called the second monomer) and then the remaining monomer mixture is polymerized in a different system in which the second monomer is polymerized at least twice as quickly as the first monomer, thereby materially reducing the over-all time for the polymerization. Because initially the first monomer polymerizes more rapidly than the second monomer, the monomer mixture remaining after the first step of the process has a decreased percentage content of the first monomer and an increased percentage content of the second monomer. Thus, for instance, if a mixture of piperylene isomers is first polymerized in solution using a lithium-based catalyst the trans-monomer is relatively quickly reacted leaving a reaction mixture with an increased percentage content of the cis-monomer; and then the unpolymerized monomer mixture of higher cis-piperylene content is separated from the resulting solution, and then polymerized in an aqueous free radical system.

The lithium-based catalyst of this invention can be metallic lithium or an organolithium compound in which the lithium exerts a sufficiently strong reducing action to displace hydrogen from water. "Organolithium compounds," as used herein, include the various lithium hydrocarbons, i.e., hydrocarbons in which one or more hydrogen atoms have been replaced by lithium, and adducts of lithium with polycyclic aromatic compounds. Suitable lithium hydrocarbons are for instance alkyllithium compounds such as methyllithium, ethyllithium, butyllithium, amyllithium, hexyllithium, 2-ethylhexyllithium and n-hexadecyllithium. In addition to the saturated aliphatic lithium compounds, unsaturated compounds are also suitable such as allyllithium, methallyllithium and the like. Aryl-, alkaryl- and aralkyl-lithium compounds such as phenyllithium, the several tolyl- and xylyl-lithiums, alpha- and beta-naphthyllithium and the like are also suitable. Mixtures of the various hydrocarbon lithium compounds are also suitable. For instance, a catalyst can be prepared by reacting an initial hydrocarbon lithium compound successively with an alcohol and with an olefin such as propylene (i.e., a technique analogous to the "Alfin" technique) whereby a greater or lesser proportion of the lithium from the initial hydrocarbon goes to form a lithium alkoxide and to form a new organolithium compound with the olefin. Additional hydrocarbon lithium compounds are the hydrocarbon polylithium compounds such as for instance any hydrocarbon containing from 1 to about 40 carbon atoms in which lithium has replaced a plurality of hydrogen atoms. Illustrations of suitable hydrocarbon polylithium compounds are alkylenedilithium compounds such as methylenedilithium, ethylenedilithium, trimethylenedilithium, pentamethylenedilithium, hexamethylenedilithium, decamethylenedilithium, octadecamethylenedilithium and 1,2-dilithiumpropane. Other suitable polylithium hydrocarbons are polylithium-aryl, aralkyl and alkaryl compounds such as 1,4-dilithiumbenzene, 1,5-dilithiumnaphthalene, 1,2-dilithium-1,3-triphenylpropane, and the like. Tri- and higher lithium hydrocarbons are also suitable, such as 1,3,5-trilithiumpentane or 1,3,5-trilithiumbenzene. Other compounds include the various lithium hydrocarbon amides. Likewise, there can be employed the lithium-polynuclear aromatic hydrocarbon adducts produced by simply reacting lithium metal with naphthalene, anthracene, biphenyl and the like polynuclear aromatic hydrocarbons. The hydrocarbon acquires a negative charge without losing any of its hydrogens, and serves as the anion (the lithium losing an electron to serve as the cation) of the salt. It should be understood that metallic lithium and the various lithium compounds may be used either alone, or in any combination as mixtures with each other. Tetramethylenedilithium is used herein as illustrative of a lithium-based catalyst.

The polymerization of the trans-isomer is more rapid when the polymerization is carried out in the presence of a lithium-based catalyst and, conveniently, any aliphatic or aromatic hydrocarbon which is a solvent for the monomer and is liquid at the reaction temperature. The solvents usually employed are hexane, pentane, petroleum ether, benzene and toluene, and mixtures thereof. The solvent can be piperylene itself. Higher or lower boiling solvents such as the butanes, the xylenes, etc. can be used where reaction conditions satisfactorily take account of differences in volatility of the solvents. The amount of catalyst employed can vary between 0.00002 and 0.1 gram of lithium per 100 grams of total monomer but is usually 0.0001 to 0.05 gram of lithium for each 100 grams of piperylene present. The polymerization is carried out in an inert atmosphere (usually nitrogen) at any desired temperature from 0° to 100° C., more or less. The percentages of trans-1,4-addition and cis-1,4-addition in the reaction product will vary, depending upon the polymerization conditions, and may be controlled by the addition of modifiers, but the percentage of vinyl side groups in the polymer product (usually 1,2-polymer) is always under 5 percent and is usually less than one percent.

In the aqueous free radical systems the polymerization is carried out in suspension or emulsion. The commercial procedures for production of SBR are typical. Typical catalysts are cumene hydroperoxide, p-methane hydroperoxide and di-isopropyl-benzene hydroperoxide with iron pyrophosphate or with polyamines such as diethylene triamine, trimethyl tetramine, tetrabutyl pentamine. Emulsion polymerizations are generally carried out at a lower temperature of about 5° C. or an elevated temperature of about 50° to 70° C., but intermediate temperatures as well as somewhat lower and higher temperatures can be used.

Piperylene is usually obtained as a by-product in the manufacture of isoprene by the catalytic dehydrogenation of pentane or of pentene, or by cracking hydrocarbons. In its commercial form, in which it is usually about 90–95 percent pure, piperylene contains appreciable isoprene and also some cyclopentadiene and alpha-acetylenes, such as isopropenyl acetylene. The latter two components are inhibitors of piperylene polymerization and are advantageously removed before the piperylene is subjected to polymerization. The cyclopentadiene can be removed by treatment with maleic anhydride, usually at an elevated temperature of, for example, 50° C., and the alpha-acetylenes can be removed by reaction with a reagent containing the cuprous ion. The by-product piperylene contains both the trans-1,4 isomer and the cis-1,4 isomer. Polymerization of either pure isomer yields polymers containing both cis- and trans-configurations.

In a preferred procedure, piperylene is polymerized first in a system in which the trans-monomer is more rapidly polymerized, as by polymerizing in a hydrocarbon solvent using a lithium-based catalyst. The unreacted monomer is distilled from the resulting solution and subjected to polymerization in an emulsion system.

The following example illustrates the invention. The mixed piperylene was a commercial mixture containing 34.5 percent cis-monomer and 58.6 percent trans-monomer, together with 1.2 percent isoprene and 5.7 percent of polymerization inhibitors which were first removed as described above.

Fifty parts of the mixed piperylenes dissolved in 100 parts of n-pentane, previously treated to remove all trace of moisture, was placed in a warm polymerization bottle which had been oven dried at 50° to 60° C. before use. The solvent volatilized by the heat of the container was sufficient to remove all air. There was added sufficient tetramethylenedilithium to provide 0.009 gram of lithium per 100 grams of piperylene. The bottle was immediately capped and agitated in a polymerization bath at 50° C. After 40 hours there was obtained a yield of 57.5 percent of polymer of the following microstructure, as determined by infrared analysis:

|   | Percent |
|---|---|
| Cis-1,4-addition | 27.6 |
| Trans-1,4-addition | 71.9 |
| 1,2-addition | 0.5 |

The unreacted monomer was recovered by distillation from the polymer solution. Cis-piperylene reacts very slowly in the lithium system, and analysis of the unreacted monomer showed that it contained 76.5 percent cis-monomer and 23.5 percent trans-monomer.

A suitable formula for the second polymerization step is

|   | Parts |
|---|---|
| Water | 180 |
| $K_2S_2O_8$ (catalyst) | 0.6 |
| Daxad 11 | 0.15 |
| KCl | 0.10 |
| Sulfole–B–8 | 0.05 |
| Sodium soap | 5.0 |
| Piperylene | 100 |

Daxad 11 is a dispersing agent, being described as the sodium salt of an alkyl naphthalene sulfonic acid; another known dispersing agent can be used. Sulfole–B–8 is a mixture of tertiary dodecyl mercaptans, a molecular weight modifier; another known molecular weight modifier can be used. The potassium chloride is an electrolyte which enhances the activity of the soap emulsifier and reduces the viscosity of the polymer emulsion.

The polymer conversion was carried forward at about 50° C. for 19 hours and then 7 days at about 70° C. The resulting polymer product was a synthetic rubber.

By first polymerizing the mixture under conditions conducive to rapid polymerization of the trans-piperylene, separating the unreacted monomer from the polymerized product, and then polymerizing it under conditions conducive to rapid polymerization of cis-monomer, the total monomer content is polymerized in the shortest time. The process is commercially feasible only if there is a minimum of at least about twenty percent (preferably above about 25 percent) of each monomer in the original mixture.

If the cis-monomer is polymerized first, the trans-monomer is advantageously removed from the emulsion product by distillation, and is dried before it is polymerized in a solvent system.

Modifiers, etc., as known in the art, can be used to improve the process, and temperatures and other conditions of the respective polymerizations can be varied, as known in the art, to accomplish desired results.

The piperylene polymers produced by the invention are rubbers and can be vulcanized by means well known to the natural and synthetic rubber art. The polymers form blends with other rubbers (such as natural rubber, butadiene-styrene copolymers, linear polybutadiene and high-cis synthetic polyisoprene) useful in tire body, tread and sidewall stocks and in mechanical rubber goods.

What I claim is:

1. A two-step process of utilizing a mixture of trans- and cis-piperylenes, referred to herein as the first and second monomers, in the production of polypiperylene with the separate use of an aqueous free-radical catalyst system and a lithium-based catalyst system, which process comprises subjecting the mixture to polymerization in one of said systems in which a first monomer is polymerized at least twice as rapidly as the second monomer to such extent that the monomer mixture is enriched as regards the second monomer, separating unreacted monomer mixture from the polymer product, and then subjecting said unreacted monomer to polymerization in the other of said systems in which the second monomer is polymerized at least twice as rapidly as the first monomer.

2. A process for improved utilization of a mixture consisting essentially of trans-piperylene and cis-piperylene containing at least 20 percent of each monomer, which process comprises polymerizing the mixture in an aqueous free radical system until trans-piperylene predominates in the unreacted monomer mixture, separating unreacted monomer mixture from the polymer product by distillation, and thereafter subjecting said unreacted monomer mixture to polymerization by means of a lithium-based catalyst.

3. A process for improved utilization of a mixture consisting essentially of trans-piperylene and cis-piperylene containing at least 20 percent of each monomer, which process comprises polymerizing the mixture by means of a lithium-based catalyst until cis-piperylene predominates in the unreacted monomer mixture, separating unreacted monomer mixture from the polymer product by distillation, and thereafter subjecting said unreacted monomer mixture to polymerization in an aqueous free radical system.

4. The process of separating trans-piperylene from cis-piperylene in a mixture composed essentially of the two monomers and at least substantially 20 percent of each, which process comprises polymerizing the mixture by means of a lithium-based catalyst until the percentage content of cis-monomer in the reacting mixture is appreciably increased, and separating sufficient unreacted monomer from the resulting solution to produce a monomer mixture of enriched cis-piperylene content.

5. The process of claim 3 in which the initial piperylene mixture is dissolved in a hydrocarbon solvent for polymerization by means of a lithium-based catalyst, utilized to the extent of 0.00002 to 0.1 gram of lithium per 100 grams of total monomer.

References Cited in the file of this patent

UNITED STATES PATENTS

| | | |
|---|---|---|
| 2,913,444 | Diem | Nov. 17, 1959 |
| 2,962,472 | Stuart | Nov. 29, 1960 |

FOREIGN PATENTS

| | | |
|---|---|---|
| 339,243 | Great Britain | Dec. 1, 1930 |

OTHER REFERENCES

Journal of American Chemical Society (Frank et al.), published by Mack Printing Co., Easton, Pennsylvania, volume 69, October 1947, pages 2313–2317.

Chemical Week, October 26, 1957, page 76.